Aug. 25, 1964          A. R. GETZIN          3,146,197
PLEATED FILTER CONSTRUCTION
Filed Jan. 31, 1962                    2 Sheets-Sheet 1

INVENTOR.
ALLAN R. GETZIN
BY
*Ralph B. Brick*
ATTORNEY

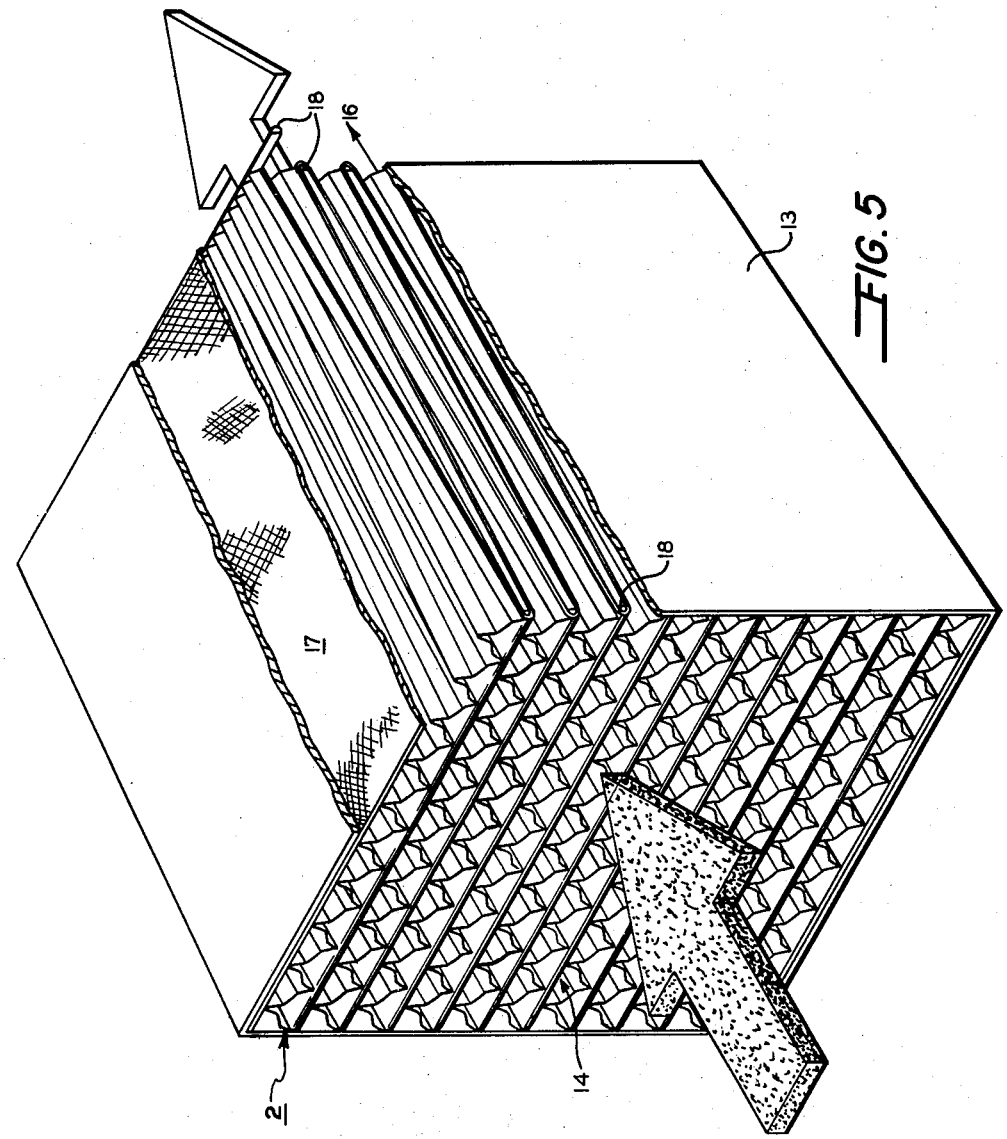

United States Patent Office 3,146,197
Patented Aug. 25, 1964

3,146,197
PLEATED FILTER CONSTRUCTION
Allan R. Getzin, Jeffersontown, Ky., assignor to American Air Filter Company, Inc., Louisville, Ky., a corporation of Delaware
Filed Jan. 31, 1962, Ser. No. 170,039
3 Claims. (Cl. 210—493)

The present invention relates to filters and more particularly to unit filters of the pleated type.

It is well known in the filtration art to extend filter material in pleated formation across a fluid stream to be treated with the pleats of the filter material being held in spaced relationship from each other by spacer members. Arrangements which have been utilized in the past to accomplish the pleat spacing have been numerous. Many of these arrangements have been suitable for use only in limited environments where the pleats have been of certain shapes and of shallow depths. Others have required costly materials and have been expensive and complex to construct and assemble into units. Still others have occasioned actual stressing of the material employed in the spacer construction, leading to distortion and inefficiency in the assembled units.

In accordance with the present invention, a spacer arrangement is provided which avoids the aforementioned disadvantages of past constructions, the spacer arrangement of the present invention being readily and economically constructed and assembled without undue stressing of material employed. In addition, the structure of the present invention can be adapted for various types of pleat arrangements, is suitable for spacing pleats of various depths, and provides maximum pleat support where maximum support is needed.

Various other features of the present invention will become obvious to one skilled in the art upon reading the disclosure set forth herein.

More particularly the present invention provides an apparatus for filtering a dirty fluid stream comprising an open ended housing defining a fluid passage between spaced opposed fluid inlet and fluid outlet faces, filter material disposed in pleated formation across the fluid passage, and spacing members separating the pleats of the filter material, the spacing members being comprised of blanks of foldable material, each blank being divided into a plurality of spaced substantially parallel fold lines running transversely thereof and folded in zig-zag fashion along the fold lines to provide a plurality of fold increments, with certain of the fold increments being so displaced relative adjacent fold increments that one zig-zag edge of the blank transverse the fold increments has a depth measured between a pair of straight substantially parallel lines determined by the extreme peaks of the increments along such edge greater than a similarly measured depth of the opposite edge of such blank.

It is to be understood that various changes can be made in the arrangement, form, and construction of the apparatus disclosed herein without departing from the scope or spirit of the present invention.

Referring to the drawings which discloses one advantageous embodiment of the present invention:

Referring to FIGURES 1–4 of the drawings, the inventive spacer member can be formed from a blank 2 of suitably foldable sheet material having a quality and thickness which permits it to hold the shape into which it is folded. Any one of a number of known materials can be utilized for the spacer members, and advantageously a good quality cardboard can be employed. The blank 2 is sized in accordance with the particular size and shape of the pleated unit filter assembly in which it is to be employed and is first folded along a series of fold lines 3 to provide a plurality of fold increments 4. In the advantageous embodiment of the apparatus disclosed, fold lines 3 are parallel to and are equally spaced from each other when the blank is in the flattened condition. However, it is to be understood that the present invention is not to be considered as necessarily limited to such an arrangement since various fold line spacing arrangements can be employed to obtain a number of different spacing member overall configurations.

Figures 1, 3:
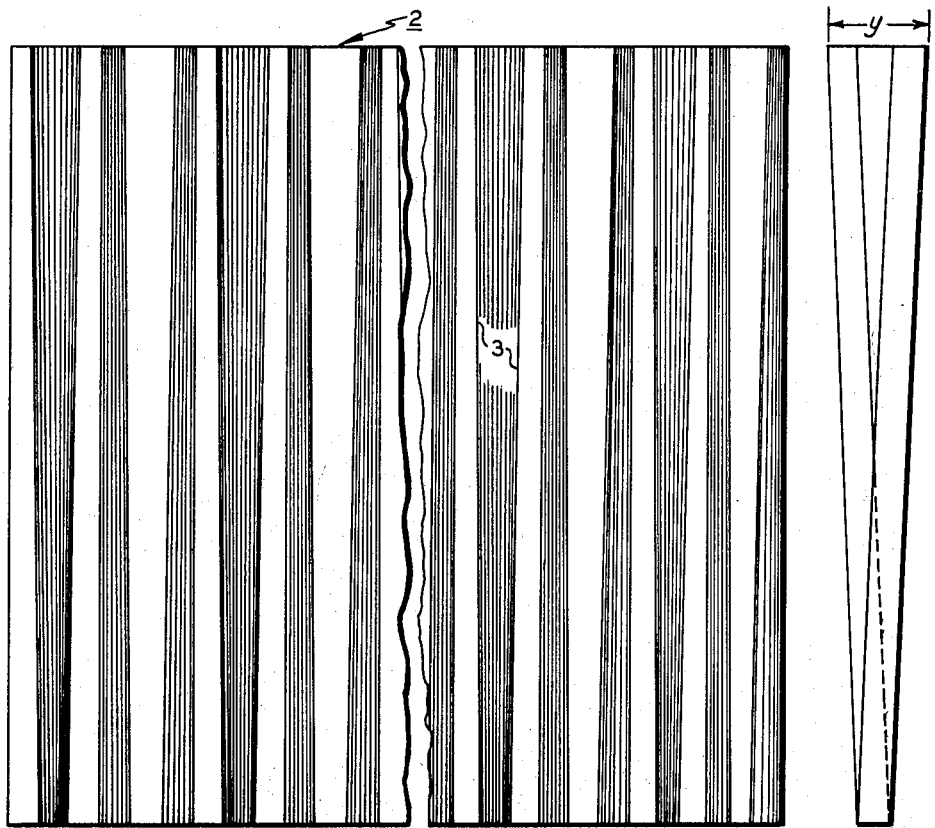
FIGURE 1 is a plan view of a portion of one of the folded spacing members of the present invention.
FIGURE 3 is a side view of the structure of FIGURE 1.
Figure 2:
FIGURE 2 is an end view of the structure of FIGURE 1.
Figure 4:
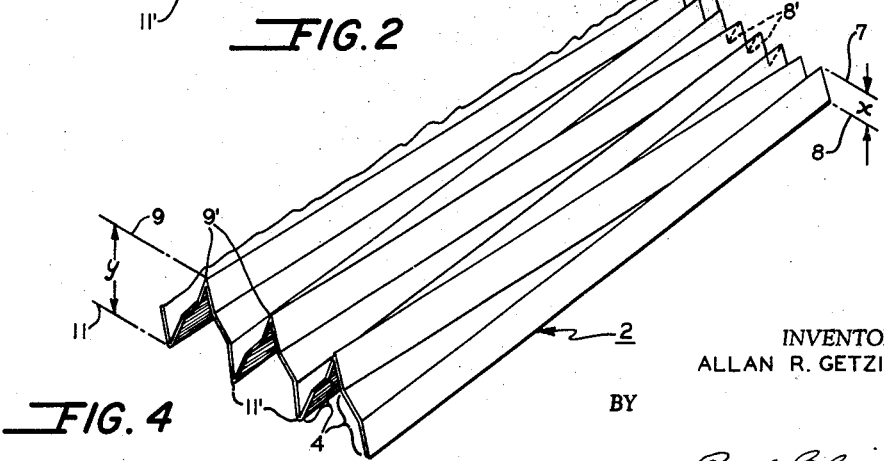
FIGURE 4 is a reduced perspective view of a portion of the structure of FIGURE 1; and, FIGURE 5 is a partially broken away perspective view of a pleated unit filter assembly incorporating spacer members like that of FIGURES 1–4.

To fold blanks 2 efficiently, a fluted roller pair arrangement (not shown) or other folding machinery known in the paper setting-up art can be adapted to accomplish the operation automatically. Once blank 2 has been folded in a preselected zig-zag formation to provide fold increments 4, the blank can then be further folded to give it the final overall wedge-like configuration which makes it adaptable for use in a pleated unit filter assembly in which the pleats are of V-shaped cross section (FIGURE 5). This is accomplished by maintaining the peaks of fold increments 4 along one zig-zag edge of blank 2 extending transverse fold line 3 as at 7' and 8' serve to determine a pair of space parallel line 7, 8 respectively between which depth "$x$" of such edge is measured (FIGURES 3 and 4). On the opposite zig-zag edge of blank 2, every other fold increment 4 can be displaced in preselected amount relative adjacent peaks so that certain peaks of such edge as at 9' and 11' serve to determine a pair of spaced parallel lines 9, 11, respectively, between which depth "$y$" of such edge, and of greater magnitude than depth "$x$," is measured.

It is to be understood that the present invention is not to be considered as limited to the peak displacement arrangement disclosed and, that if desired, other peaks displacement arrangements can be used to provide other spacer member wedge-like overall configurations. It further is to be understood that the further displacement of folds in the manner abovedescribed can be accomplished automatically by feeding the zig-zag folded blank 2 through a pair of conical rolls which have been suitably fluted (not shown) to accomplish the displacement of preselected peaks along one edge of the zig-zag folded blank.

Once a blank 2 has been folded and displaced to provide an appropriately preselected overall wedge-like configuration (FIGURE 4), it can be utilized as a spacing member in a unit filter assembly. As shown in FIGURE 5, the unit filter assembly can include an open-ended housing 13 defining a fluid passage between spaced opposed fluid inlet 14 and fluid outlet 16. A continuous sheet of filter material 17 is disposed in pleated formation across the fluid passage defined by open-ended housing 13 and the spacing members serve to separate the pleats of the filter material as disclosed. It is to be noted that, in order to prevent wear along the valleys of the pleats formed by the filter material 17, suitable half-round rod members 18 of a light material, such as aluminum, can be provided, these rod members 18 being so positioned that the edges of lesser depth of the spacing members abut thereagainst. It also is to be noted that at the inlet and outlet sides of the unit filter assembly, only the fold lines of the extreme fold increments 4, as indicated by 9' and 11' abut against the faces of the pleated filter material 17. However, adjacent the bottoms of the valleys of the pleats of the filter material, the fold lines of all of the increments 4 engage against the pleat surfaces to offer additional support at such valley bottoms. Thus, support is provided where it is most needed to prevent abutment of one pleat face against the other.

The invention claimed is:

1. Apparatus for filtering a dirty fluid stream comprising:
   (a) an open-ended housing defining a fluid passage between spaced, opposed fluid inlet and fluid outlet faces,
   (b) filter material disposed in pleated formation across said fluid passage, and
   (c) spacing members separating the pleats of said filter material,
   (d) said spacing members being comprised of blanks of foldable material,
   (e) each blank being divided into a plurality of spaced substantially parallel fold lines running transversely thereof and folded in zig-zag fashion along said fold lines to provide a plurality of fold increments,
   (f) with at least some of said fold increments being so displaced relative adjacent fold increments that one zig-zag edge of said blank transverse said fold increments has a depth measured between a pair of straight substantially parallel measuring lines determined by extreme peaks of said zig-zag edge substantially greater than a similarly measured depth of said opposite edge of said blank.

2. The apparatus of claim 1 wherein said edge of lesser depth of said blank has the peaks of all of said fold increments serving to determine said pair of straight parallel measuring lines between which said lesser depth is measured.

3. The apparatus of claim 1, said parallel fold lines of said blank being equally spaced.

References Cited in the file of this patent
UNITED STATES PATENTS
2,720,937    Root _____ Oct. 18, 1955